United States Patent [19]

Gavin

[11] Patent Number: 5,538,035
[45] Date of Patent: Jul. 23, 1996

[54] PLASTIC FLUID DISTRIBUTION BOX WITH INTEGRALLY FASTENED SEAL

[76] Inventor: Norman W. Gavin, 2545 Ridge Rd., North Haven, Conn. 06473

[21] Appl. No.: 389,874

[22] Filed: Feb. 17, 1995

[51] Int. Cl.⁶ .................................................. F16L 5/00
[52] U.S. Cl. .................................................. 137/363; 52/20
[58] Field of Search ................................ 52/20; 137/363

[56] References Cited

U.S. PATENT DOCUMENTS

| | | | |
|---|---|---|---|
| 3,714,961 | 2/1973 | Davidson et al. | 137/363 |
| 3,850,457 | 11/1974 | Bigotte et al. | 137/363 |
| 3,938,285 | 2/1976 | Gilbu | 52/20 |
| 4,089,139 | 5/1978 | Moffa et al. | 52/20 |
| 4,128,107 | 12/1978 | Blumhardt | 137/318 |
| 4,275,757 | 6/1981 | Singer | 137/363 |
| 4,440,406 | 4/1984 | Ericson | 277/207 |
| 4,663,036 | 5/1987 | Strobl, Jr. et al. | 210/170 |
| 4,732,397 | 3/1988 | Gavin | 277/207 |
| 4,805,920 | 2/1989 | Gavin | 277/207 |
| 5,286,040 | 2/1994 | Gavin | 277/207 |
| 5,361,799 | 11/1994 | Chilton et al. | 137/363 |

*Primary Examiner*—A. Michael Chambers
*Attorney, Agent, or Firm*—Robert A. Seemann

[57] ABSTRACT

A plastic fluid subterranean distribution box with integral seal for a pipe, permanently and sealingly mounted in an opening in a wall of the box, including a substantially continuous annular bond between the seal and the wall on one side of the wall.

2 Claims, 5 Drawing Sheets

PLASTIC FLUID DISTRIBUTION BOX WITH INTEGRALLY FASTENED SEAL

BACKGROUND OF THE INVENTION

1. Field of the Invention

This invention relates to fluid handling, more specifically to a subterranean, plastic, box for fluid distribution, such as is used in septic tank systems and geographical drainage, which has seals for receiving and sealing around subterranean pipes.

2. Description of the Prior art

It is important to have secure and watertight sealing at a first stage between a fluid distribution box and the seal means at an opening through the box wall, and at a second stage between the seal means and the pipe which is connected to the box by entering through the seal means. The strength and watertightness of each of these two stages of sealing is attacked by physical impact against the pipe and seal of the backloading of soil into the trench in which the box and pipes are buried, and by heaving and settling of soil around the wall openings and the pipes over the 10, 15, or more years during which the subterranean distribution system must last.

Installers and manufacturers are well aware of the above problem of providing long time and secure sealing of underground boxes. Many inventions which attempt to solve the problem for concrete and for plastic boxes have been patented.

Concrete boxes have thick walls and a high weight to volume ratio. They are seldom subjected to upward floating movement from soil water displaced by the box during rises in the water table, and tend to be stable if properly bedded. Effective two stage seals have been developed for the concrete box and have been contributing a solution to the problem for many years.

U.S. Pat. No. 4,732,397, patented Mar. 22, 1988 by Norman Gavin describes a plastic seal which includes an integral annular flange on the cylindrical outer body portion of the seal. The flange extends generally radially outwardly and is adapted to be embedded in the cast cementitious material about an opening through a wall of a concrete distribution box during casting of the box to secure the seal in position in the opening. The cement surrounds the flange and cylindrical outer body for substantially the full axial length of the body, forming a watertight seal between the wall and the body.

U.S. Pat. No. 4,805,920, patented Feb. 21, 1989, and U.S. Pat. No. 5,286,040, patented Feb. 15, 1994, by Norman Gavin also describe a seal which includes an integral annular flange that extends generally radially outwardly and is adapted to be embedded in the cast cementitious material about the opening through the wall of the concrete box during casting of the box.

Plastic boxes have relatively thin walls, are more likely to be dislodged by changes in the water table and shifts in soil. Both stages of seal described above are more likely to be compromised by distortion and relative movement between the box wall and seal, and between the seal and pipe. Although a solution for the described seal problems in concrete boxes has been sold and in public use for many years, a good solution for the more severe seal problem in plastic boxes is still needed.

U.S. Pat. No. 4,663,036 patented May 5, 1987 by Strobl, Jr. et al., describes a generally flexible seal for an opening through the wall of a plastic distribution box. The seal includes a cylindrical outer wall having a pair of annular flanges which extend generally radially outwardly and are adapted to clamp between them, the box wall immediately forming the opening. The flanges are inclined slightly toward one another, and the cylindrical wall between them includes an annular radially outwardly extending bead. The pair of annular flanges clamp and sealingly engage the box side wall adjacent to the opening, and the bead contacts the inward edge of the wall surrounding the opening when the seal is snap-fitted into the opening. A frusto-conical shaped wiper blade member which extends inwardly from one end of the cylindrical outer wall forms a pipe-receiving opening through the blade member. The blade member engages and seals against a pipe that is suitably sized to fit the opening through the blade member when the pipe is inserted through the pipe-receiving opening of the wiper blade member. The inclining of the flanges slightly toward one another contributes to sealing between the seal body and the wall of the box when the inserted pipe rotates slightly out of axial alignment with the axis of the cylindrical outer wall. An excessive angle with respect to the axis of the cylindrical wall, of a pipe inserted through the pipe-receiving opening, can cause the snap-fitted seal member to pop out of the box wall opening. Soil hydraulic and shifting forces also can have a deleterious effect upon the long time reliability and quality of the two stages of sealing.

A twist-in seal for a plastic distribution box is made by American Manufacturing Co. Inc., Manassas, Va. The seal 20, shown in FIGS. 1–4, labeled PRIOR ART, has a pair of annular flanges 24 and 28 which extend generally radially outwardly and are adapted to clamp between them, wall 32 of a plastic distribution box, immediately where it forms opening 36. Flange 24 is continuous, flexible and inclined toward flange 28 so that surface 38 sealingly contacts wall 32 when wall 32 is clamped between flanges 24 and 28. Flange 28 formes a plurality of lugs 44 which have inclined lead faces 46. Seal 20 is installed in the box wall 32 opening 36 which has radially inwardly extending portions 54 by orienting seal 20 so that lugs 44 clear portions 54 when flange 28 is inserted through opening 36, then rotating seal 20 so that lead faces 46 engage portions 54 and draw surface 38 of flange 24 sealingly against wall 32. Axially extending grip bars 58 are provided for use by an installer to aid in twisting the seal in place against the counterrotational friction between the flanges and the wall. Frustoconical flexible seal wall 62 forms opening 64 for receiving a pipe of proper diameter so that wall 62 seals against the outer surface of the pipe. The installer must take care not to rotate the pipe after installation, as there is a chance that the pipe may rotate the seal toward an unlocking position or to one of reduced sealing force between flange 24 and wall 32.

U.S. Pat. No. 5,361,799, patented Nov. 8, 1994 by Chilton et al, describes a subterranean, plastic, preformed waste water access fitting comprising a hollow body that has a vertical extension and two horizontal extensions. The vertical extension is sealed over at the top, and can be cut off at the top in order to obtain access to the inside of the body for maintenance or to insert a standpipe. Each of the horizontal extensions are formed of connected segments of decreasing outer diameter with a cutting guide on each segment. The segments can be cut to mate with various diameters of pipe.

SUMMARY OF THE INVENTION

It is one object of the present invention to provide a plastic distribution box with plastic seal in which the first stage of sealing between the seal body and the box is leaktight and the seal cannot be dislodged from the box by dint of force from the surrounding soil or twist of pipe, and which provides at the second stage of sealing superior sealing between the seal body and the pipe.

It is another object to provide a seal which is integrally and permanently fastened to the distribution box, and integrally and permanently sealed to the distribution box around the box wall opening which contains the seal.

It is another object to provide in the distribution box and seal of the above objects, water tight seal at one wall opening permanently containing a seal, for a pipe selected from a variety of pipe diameters that pass through the seal into the box.

Other objects and advantages will become apparent to one reading the following description of the invention.

A plastic fluid distribution box and integral seal adapted for subterranean burial comprise a wall having an outer side and an inner side with respect to the box. A seal is mounted in an opening in the wall and is permanently and sealingly fastened to the wall.

The seal includes an opening through the seal for receiving a pipe through the seal and the wall. Means on the seal engage the pipe when the pipe is in the second opening.

One end of the seal extends from one of the inner and outer sides of the wall.

The permanent and sealingly fastening of the seal to the wall is by means which provides a substantially continuous annular bond between the seal and the wall. The annular bond comprises a bond between one of the outer side and the inner side of the wall and a generally radially outward extension of the seal which extends generally normally from the wall.

BRIEF DESCRIPTION OF THE DRAWINGS

In order that the invention be more fully comprehended, it will now be described, by way of example, with reference to the accompanying drawings, in which:

FIG. 1 is a side view of a prior art seal.

FIG. 2 is a front view of the prior art seal of FIG. 1.

FIG. 3 is a rear view of the prior art seal of FIG. 1.

FIG. 4 is a front view of a plastic distribution box wall opening configured for receiving the prior art seal of FIG. 1.

FIG. 5 is a perspective view of a plastic fluid distribution box with integrally molded seals, of the present invention.

FIG. 6 is a vertical cross section view of a portion of the box of FIG. 5, with a pipe through a seal.

FIG. 7 is a vertical cross section view of a portion of the box of FIG. 5, with a pipe through another seal.

FIG. 8 is a vertical cross section view of a portion of the box of FIG. 5, with a pipe through another seal.

FIG. 9 is a vertical cross section view of a portion of the box of FIG. 5, with another seal.

DESCRIPTION OF THE PREFERRED EMBODIMENTS

Figure 1:
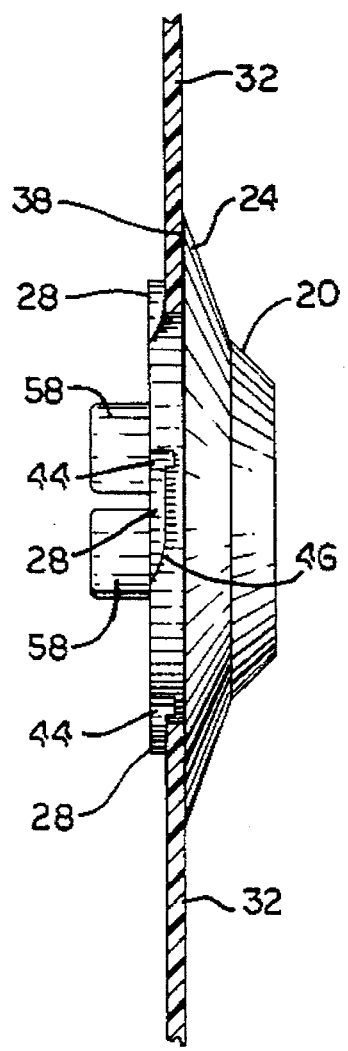
FIGS. 1–4 are of Prior Art.
Figure 2:
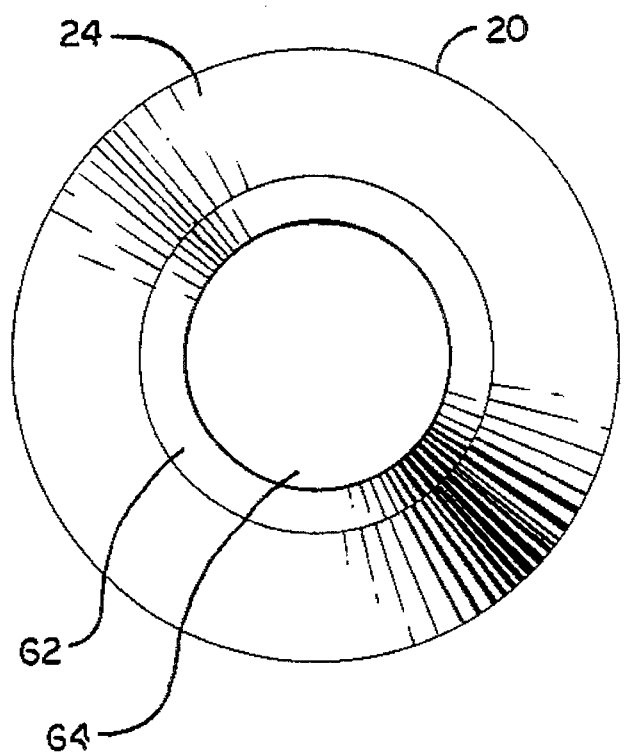
Figure 3:
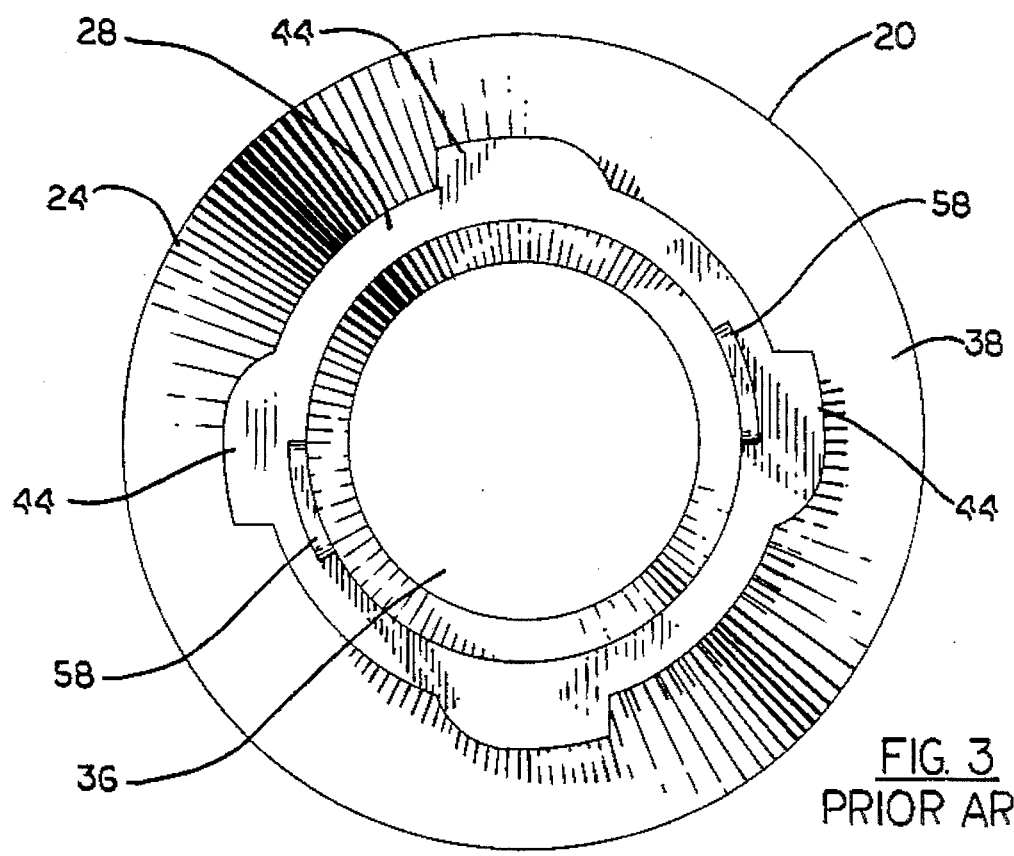
Figure 4:
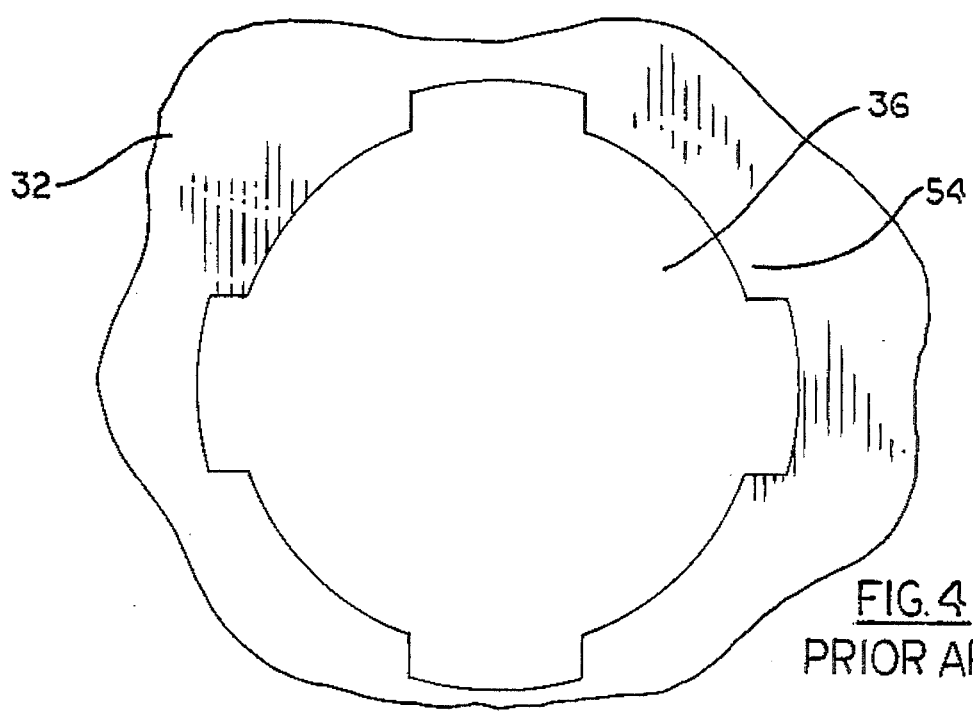

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Figure 5:
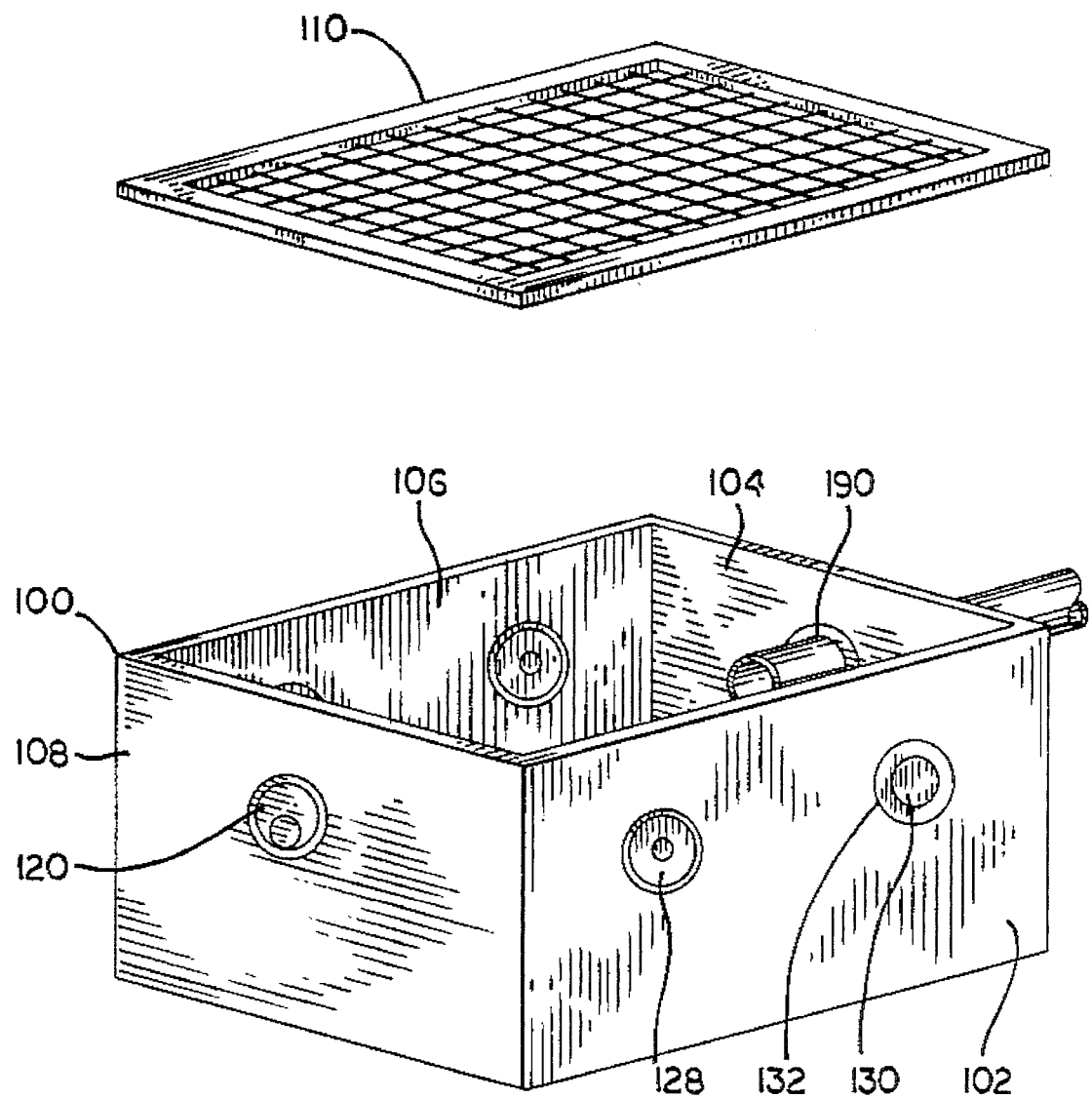
FIGS. 5–9 are of the present invention.

Plastic distribution box 100 shown in FIG. 5 with drain grate cover 110, includes several different seals for receiving pipes through walls 102, 104, 106, and 108. Included therein are seals of the type described and patented in U.S. Pat. Nos. 4,732,397, 4,805,920, and 5,286,040. U.S. Pat. Nos. 4,732, 397, 4,805,920, and 5,286,040 are hereby incorporated by reference.

Seal 120 has an asymmetrical pipe seal design which can be adjusted to receive and provide a seal around any one of a number of diameter pipes without having to significantly change the height of the pipe trench bed which supports the pipe at the height that is suitable for the pipe to be received in the seal. Seal 120 is described in U.S. Pat. No. 5,286,040.

Seal 128 can be adjusted to sealingly fit various diameter pipes. Regardless of the diameter of the pipe, it is supported by the seal on a common axis. Seal 128 is described in U.S. Pat. No. 4,805,920.

Figure 6:
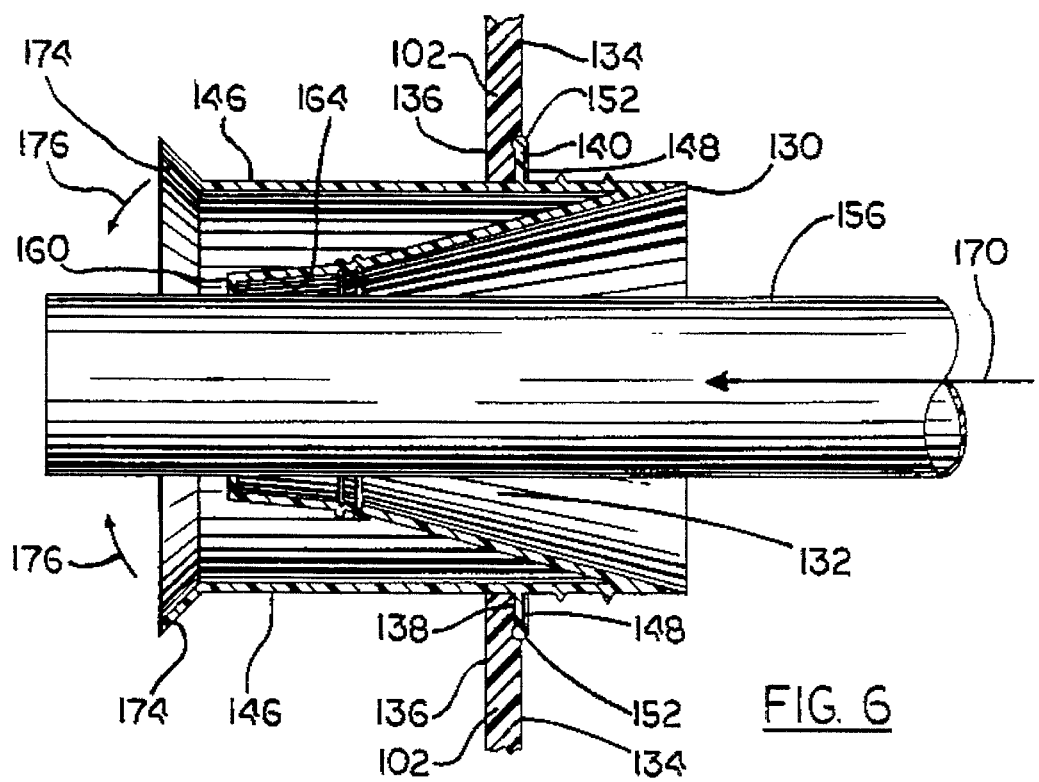

Seal 130, is described in U.S. Pat. No. 4,732,397. Referring to FIG. 6, the seal is mounted in wall opening 132 permanently integrally fastened to wall 102. A continuous watertight seal exists between outer side 134 of wall 102 and backside 138 of annular flange 140 which extends generally radially outwardly from cylindrical outer wall 146 of seal 130.

Fastening is preferably by means which provide a substantially continuous annular bond between flange 140 and wall 102, such as a fusion or weld bond between backside 138 and outer side 134. The bond is preferably made by ultrasonic welding, or otherwise heating the plastic of wall 102 and of seal 130. A chemical bonding agent may also be used to provide the continuous annular bond.

The bond provides resistance to soil hydraulic forces and pipe twisting forces that prevents seal 130 from being dislodged by the forces, and establishes a permanent watertight seal between the wall and seal 130. Greater resistance to detrimental shear forces is provided by rim 152 fastened to and extending axially onto the outer side of wall 102. A secure water resistant seal between seal 130 and pipe 156 is provided by annular sealing edge 160 of frustoconical sealing skirt 164.

A plurality of mechanical fasteners such as rivets may also be used to fasten the seal to the wall so as to provide the continuous annular bond between the seal and the wall. Heat or chemical fastening, however, is preferred because of lower overall cost and more uniform sealing.

In this arrangement in which flange 140 is fastened to the wall at the outer side of the wall, seal 130 is passed through opening 132 in wall 102 from the front side of the wall in the direction of arrow 170, before fastening it to the wall. Bell flange 174 is sufficiently flexible so that the bell flange can be folded radially inward in the direction of arrows 176, to provide clearance between flange 174 and wall 102 so that seal 130 can be inserted through opening 132.

Figure 7:
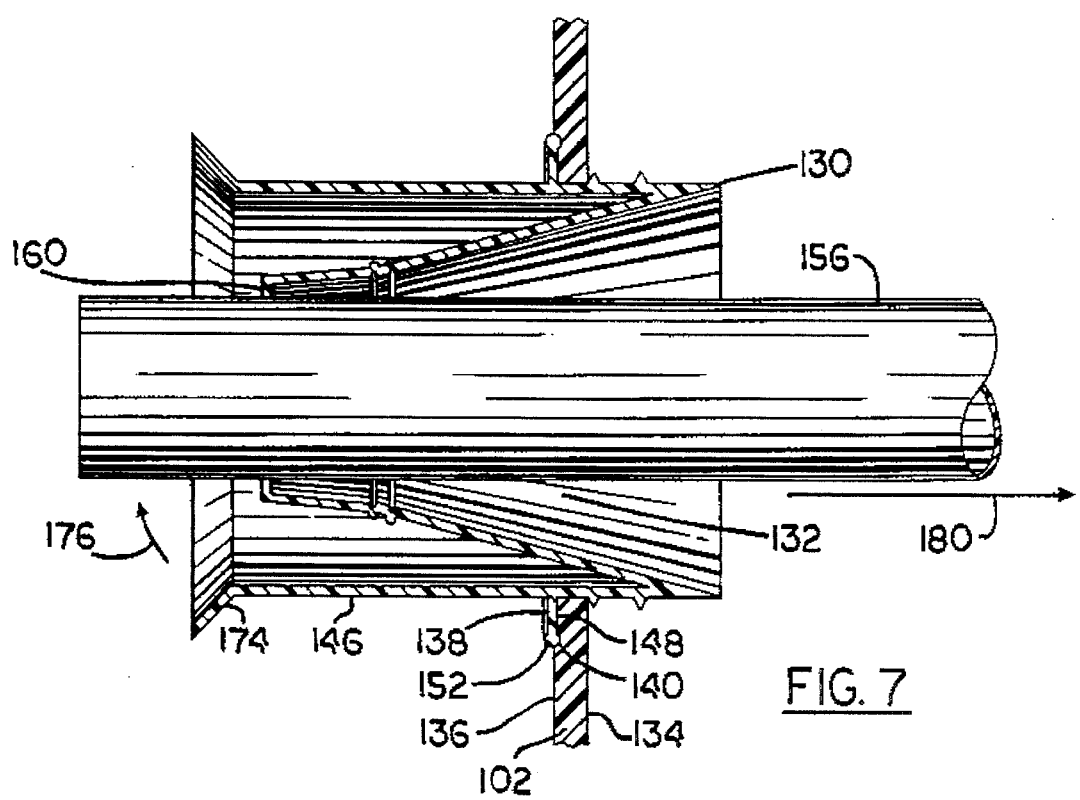

FIG. 7 shows flange 140 fastened to wall 102 with front side 148 of the flange fastened to inner side 136 of the wall. In this arrangement, seal 130 is passed through wall 102 from inner side 136 as shown by direction arrow 180, before fastening it to the wall.

Figure 8:
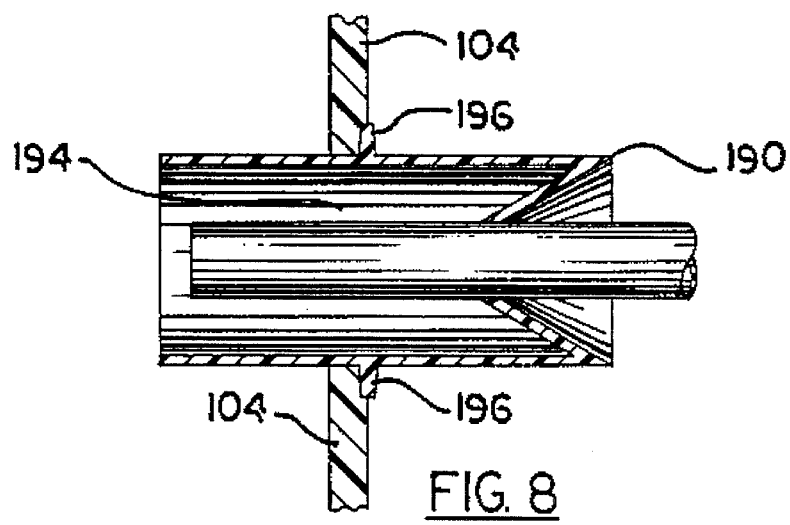

In FIG. 8, seal 190 is permanently, sealingly fastened in wall 104. Installation in opening 194 through wall 104 from either direction depending upon which side of the wall one plans to fasten continuous annular flange 196 is more convenient in the absence of a bell flange, as the seal can be installed without having to deform a bell.

Figure 9:
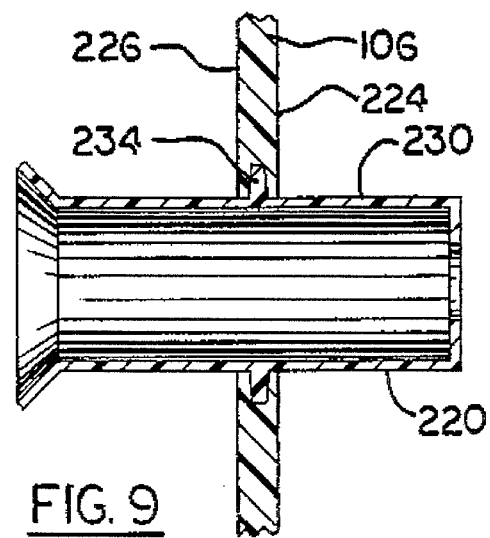

In FIG. 9, seal 220 is permanently, sealingly fastened in wall 106. Although the body of the seal extends axially beyond the front side 224 and the back side 226 of wall 106, flange 234 is substantially enclosed within wall 106. This can be accomplished by remelting the wall plastic to enclose the flange. If desired, flange 234 can be eliminated and wall 106 can be permanently, sealingly, fastened directly to outer cylindrical wall 230 of seal 220.

Figure 10:
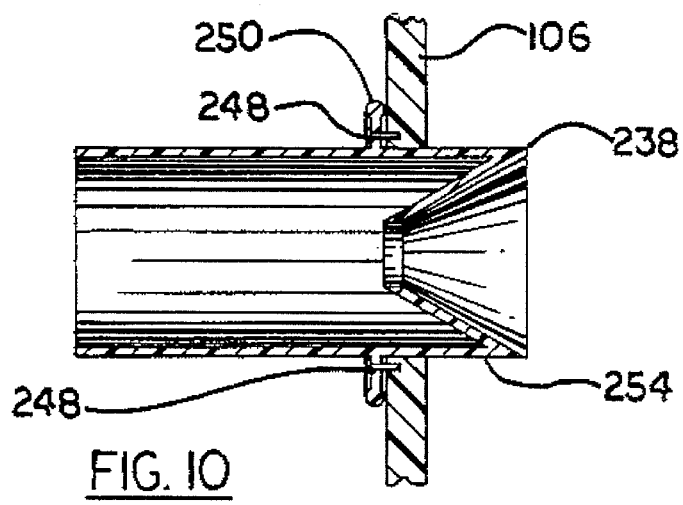
FIG. 10 is a vertical cross section view of a portion of the box of FIG. 5, with another seal.

In FIG. 10, seal 238 is permanently fastened to wall 106 by a plurality of rivets 248. Permanent watertight seal is provided by the engagement of annular flange 250 with wall 106. Further seal is provided by a chemical bonding agent for plastics between outer wall 254 of the seal and wall 106.

It should be clear from the above description of the invention that seals of other designs may be adapted for use in the present invention by providing the above permanent, structurally fastening, annular, watertight seal.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

I claim:

1. A fluid distribution box adapted for subterranean burial, comprising:

a plastic container, being one piece circumferentially, and having a top, a bottom and comprising a first wall between said top and bottom, said first wall having an outer side and an inner side with respect to said plastic box a first opening through said first wall formed by said first wall surrounding said opening in one continuous piece, a separately formed, plastic seal member comprising a cylindrical wall having a first end, a second end, said cylindrical wall comprising a second opening through said seal member from said first end to said second end for receiving a pipe through said seal member an annular flange on said cylindrical wall, extending generally radially outward from said cylindrical wall, said flange having a first side facing toward said first end of said cylindrical wall and having a second side facing toward said second end of said cylindrical wall, said cylindrical wall extending through said first opening, the first side of said flange being fastened in a continuous annular bond and continuous water tight seal to one of said outer side and said inner side of said first wall around said opening by a fusion bond, and the second side of said flange facing away from said first wall.

2. The distribution box of claim 1, further comprising:

an annular bead on said flange, extending axially on said first side of said flange, spaced from said cylindrical wall, and fused to said first wall around said first opening.

* * * * *